June 24, 1969     W. E. BUFORD ET AL     3,451,415
FLUID PRESSURE IMPULSE VALVE
Filed Dec. 23, 1966
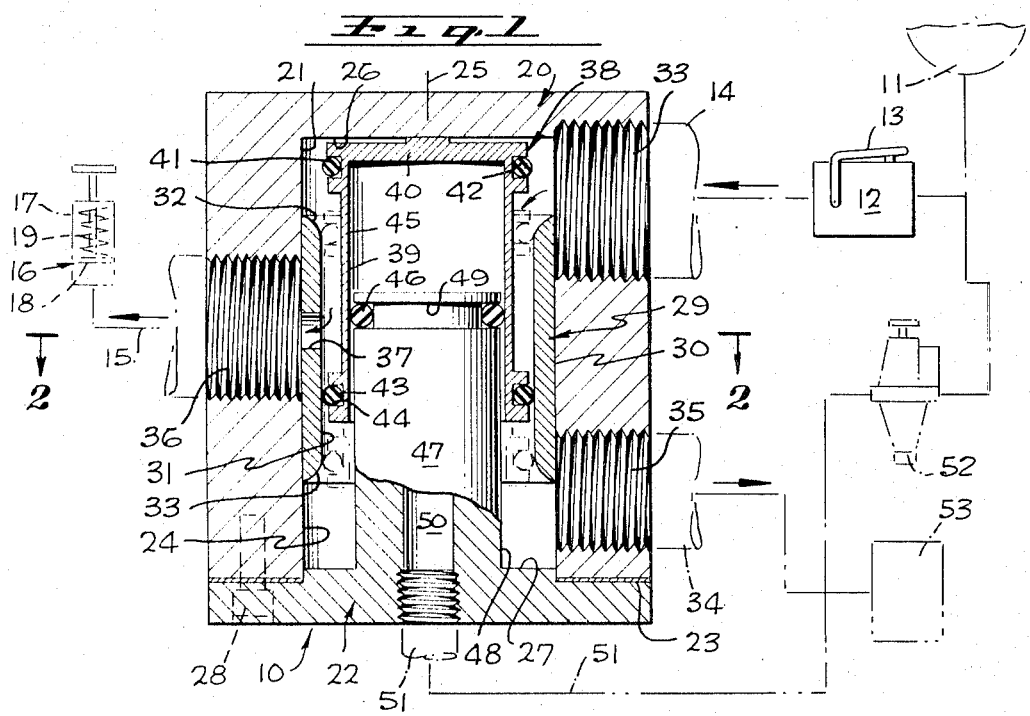
Fig. 1
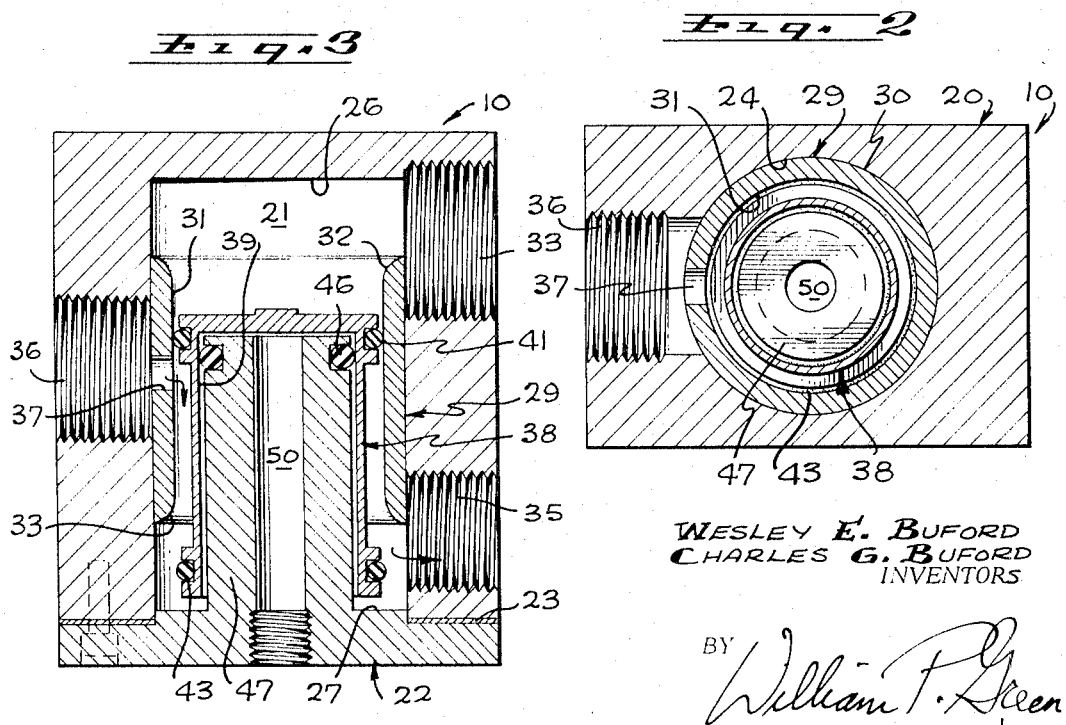
Fig. 3
Fig. 2
WESLEY E. BUFORD
CHARLES G. BUFORD
INVENTORS
BY William P. Green
ATTORNEY

United States Patent Office 3,451,415
Patented June 24, 1969

3,451,415
FLUID PRESSURE IMPULSE VALVE
Wesley E. Buford, 1045 N. Azusa, Covina, Calif. 91722,
and Charles G. Buford, 17727 Laxford Ave., Azusa,
Calif. 91702
Filed Dec. 23, 1966, Ser. No. 604,295
Int. Cl. F15b 21/12
U.S. Cl. 137—102                               15 Claims

ABSTRACT OF THE DISCLOSURE

A device for producing a fluid pressure impulse, or two successive pressure impulses, and including a body containing a valve which, in an initial position, places a predetermined fluid inlet in communication with a first outlet, and which is actuable by pressure from the inlet to a second position in a relation first closing off communication between the inlet and the first outlet, and then exhausting pressure fluid from the first outlet back through the body and to a second outlet, so that successive impulses are produced at the two outlets respectively.

---

This invention relates to improved valves of a type adapted for delivering fluid pressure impulses to a unit controlled by the valve.

A major object of the invention is to provide a valve which is capable of supplying to a controlled unit a pressure impulse of a predetermined intensity, and which valve will then function to automatically terminate the delivery of pressure fluid to the controlled unit until the next successive operation of the valve. More particularly, there may be provided in conjunction with the automatic impulse valve of the present invention a main fluid supply valve, with the automatic unit being so devised as to deliver a controlled single impulse of pressure fluid to an operated unit open each actuation of the main supply valve, and in a manner positively preventing the delivery of repeated impulses to the controlled unit even though the operator may hold the main supply valve open after the desired impulse has been delivered. Preferably, the device functions to deliver an output impulse of a pressure which may be lower than the input pressure, and which may be controlled to provide an impulse of exactly the right intensity for actuation of the driven unit.

A further object of the invention is to provide an automatic valve of the discussed type which, after supplying the desired pressure impulse to a controlled unit, will then automatically act to exhaust the pressure fluid from the controlled unit to enable its return to an initial condition in preparation for the next successive actuation of the mechanism. Further, this pressure fluid which is exhausted from the controlled unit may be delivered to a location at which it performs another useful function, so that the valve will then serve to sequentially initiate two successive operations, and then remain inactive until the next successive delivery of input fluid to the automatic valve.

With regard to structure, an impulse delivery valve of the present type may include a body structure having an inlet and an outlet, and containing valve means which are movable within the body structure between a normal open position and a closed position. The valve means are yieldingly urged to their open position, and are positioned and constructed to be actuated to closed position by the development of a predetermined fluid pressure within the device. Desirably, this pressure is not attained unless and until a controlled unit is connected to the output of the valve, so that the restriction to flow offered by that controlled unit causes the development of pressure in the automatic valve, and ultimately to a value causing actuation of the valve means to closed position. Thus, regardless of the pressure supplied at the inlet of the device, an impulse of a desired predetermined pressure is supplied at the outlet side of the unit.

The movable valve means or valve unit proper, upon each actuation, may automatically shift to a final position in which the controlled unit is placed in communication with an exhaust outlet, to thus discharge the gases from the unit, as discussed above. Preferably, the valve unit is a slide valve element which is movable axially through a single stroke each time that pressure fluid is supplied to the unit, and which is so located at the beginning of the stroke as to admit pressure fluid from the inlet to the outlet leading to the controlled unit, and which then in a final position attains the mentioned exhausting action.

It is preferred that the valve element be yieldingly urged to its initial open position by pressure fluid, which is so applied to the valve unit as to resist closing of the valve until the desired maximum pressure is attained, and to then allow closing movement of the valve. This resisting pressure may be applied to the interior of the valve element, preferably through a projection which extends into the valve element and is sealed with respect thereto.

The above and other features and objects of the invention will be better understood from the following detailed description of the typical embodiment illustrated in the accompanying drawing, in which:

FIG. 1 is an axial section through a pressure impulse valve constructed in accordance with the invention, and shown as it appears when connected to appropriate supply and controlled units;

FIG. 2 is a transverse section taken on line 2—2 of FIG. 1; and

FIG. 3 is a view similar to FIG. 1, but showing the valve in its exhausting position.

Referring first to FIG. 1, I have illustrated at 10 a pressure pulse delivery valve, which will be described as utilized in a compressed air control system, though it is contemplated that certain features of the invention may also be applied broadly to systems employing other fluids, such as other gases or liquids. The air (or other pressure fluid) is supplied by a source 11 of such fluid, and is admitted to valve 10 through a typically manually operated control valve 12, which acts upon depression of its operating element 13 to admit pressure from source 11 into an inlet line 14. The purpose of impulse valve 10 is to admit a momentary charge of air of a predetermined maximum pressure through an outlet line 15 to a controlled unit 16, which may be any of numerous different types of secondary units adapted to respond to the application of a pressure impulse thereto. For example, controlled unit 16 is typically illustrated as consisting of a cylinder 17 containing a piston 18 adapted to be actuated upwardly by air pressure against the resistance of a return spring 19.

The impulse valve 10 includes a rigid body 20, containing a chamber 21 closed at its lower end by a bottom wall member 22, which may be sealed with respect to body 20 about chamber 21 by a gasket 23. Chamber 21 has a cylindrical side wall 24 centered about an axis 25, and extending between a transverse upper wall 26 and the transverse annular surface 27 defining the lower end of the chamber. Parts 20 and 22 may be secured together in any suitable manner, as by a plurality of screws 28.

Within chamber 21, body 20 rigidly carries a sleeve 29, having an outer cylindrical surface 30 which is a pressed fit within the cylindrical side wall 24 of body 20, to rigidly and permanently locate sleeve 29 in the illustrated position within the body. Internally, sleeve 29 has an inner cylindrical surface 31 extending along the major portion of its axial extent, and centered about axis 25, and terminating at its upper and lower ends in a pair of annular outwardly flaring and outwardly curving rounded surfaces 32 and 33.

The previously mentioned inlet line 14 leading from valve 12 is connected into a threaded inlet passage 33 formed in the upper portion of body 20, and opens into a side of chamber 21, at a location above the upper end of sleeve 29. Similarly, a final exhaust line 34 is connected into another threaded bore or passage 35 formed in the lower portion of body 20, to communicate with chamber 21 at a location beneath sleeve 29. The outlet line 15 is threadedly connected into another opening 36 formed in body 20, at a location intermediate the ends of sleeve 29, and communicates with the interior of sleeve 29 through an opening 37 formed in the side wall of the sleeve.

For coaction in valving relation with sleeve 29, there is provided a slide valve element 38, having a cylindrical side wall 39 centered about axis 25, and a top wall 40 disposed perpendicular to that axis. About the periphery of this upper wall 40, valve element 38 carries a deformable seal ring 41, desirably a rubber O-ring which is received within and projects radially outwardly from and beyond an annular groove 42. A similar seal ring 43 is carried by valve element 38 at its lower end within a second groove 44. These rings 41 and 43 have normal external diameters slightly greater than the internal diameter of surface 31 of sleeve 29, and are engageable annularly with that surface in sealing relation.

Valve element 38 is movable axially between the normal upper position of FIG. 1 and the downwardly actuated air exhausting position of FIG. 3. The seal rings 41 and 43 are spaced apart axially a distance corresponding approximately to the length of straight cylindrical inner surface 31 of sleeve 29, so that in a vertically intermediate position of valve element 38, the two rings may simultaneously engage and form annular seals with opposite ends of surface 31, as indicated in broken lines in FIG. 1. It will also of course be apparent that, as either of the rings moves into contact with surface 31, the tapering rounded surfaces 32 or 33 will properly constrict the O-ring for the desired engagement with surface 31.

Internally, valve element 38 has an inner cylindrical surface 45 centered about axis 25, and which is engageable in annular fluid tight sealing relation with a deformable O-ring or other seal ring 46 carried by an upwardly projecting portion 47 of the bottom body closure member 22. Portion 47 has an outer cylindrical surface 48 of a diameter slightly less than that of inner surface 39 of valve element 38, and carries O-ring 46 within an annular groove 49 centered about axis 25. A fluid passage 50 extends upwardly within projection 47, to deliver compressed air or other pressure fluid from a line 51 into the interior of valve element 38. This pressurized fluid may be taken from a pressure reducing valve 52, whose inlet side is connected to the source 11 of compressed air, so that the pressure within valve element 38 is lower than the pressure supplied to the interior of body 20 through line 14. Alternatively, it is also possible to operate the valve 10 with the two pressures at the inside and outside of valve element 38 being equal, since the effective area against which pressure is applied downwardly is somewhat greater than the internal area of the valve element against which pressure is applied upwardly.

The air ultimately exhausted from impulse valve 10 through exhaust outlet 35 may be discharged directly to atmosphere, or may be utilized to operate a second controlled unit represented at 53 in FIG. 1, from which unit the air is ultimately discharged in some manner before the next operation of the apparatus.

To describe now a cycle of operation of impulse valve 10, assume that a steady pneumatic pressure is being supplied to manually actuated valve 12, and that a reduced pressure is being supplied continually through pressure reducing valve 52 to the interior of the valve element proper 38, through line 51. This pressure within the interior of valve element 38 normally retains the valve element in its FIG. 1 upper position of engagement with top wall 26 of body 20.

When it is desired to operate controlled unit 16 through one cycle, an operator depresses actuating element 13 of valve 12, to admit compressed air from source 11 into the interior of the upper portion of body 20, and about the upper end of valve element 38. This compressed air tends to urge valve element 38 downwardly, but cannot do so until the pressure in the upper portion of body 20 reaches a value sufficient to overcome the upward pressure exerted by the air within the interior of valve element 38. Since controlled unit 16 does not allow escape of the air which enters the upper end of body 20, the pressure does progressively increase in the upper portion of the body, and ultimately to a point at which valve element 38 is urged downwardly against the tendency of the pressure within that valve element. When upper seal ring 41 of valve element 38 annularly engages surface 32 and then surface 31 of sleeve 29, seal ring 41 closes off communication between inlet line 14 and outlet line 15 leading to controlled unit 16, so that no further pressure is applied to unit 16. The internal pressure within valve element 38 may be adjusted to cause such closure of valve element 38 when the pressure delivered to controlled unit 16 has reached any desired maximum pressure, which may typically be well below the pressure at source 11. Thus, if the pressure at source 11 is too great to be safely admitted to controlled unit 16, valve element 38 may be adjusted to automatically reduce that pressure to a pressure impulse at unit 16 of a much lower value.

Valve element 38 continues its downward movement through the broken line position of FIG. 1 and ultimately to the FIG. 3 lowermost position, in which further motion is prevented by engagement of the valve with the upper end of projection 47, As seal ring 43 moves out of contact with sleeve 29, it enables air from controlled unit 16 to exhaust back through line 15 and into the interior of sleeve 29, and then downwardly from the lower end of the sleeve and into line 34. As previously indicated, this exhausting air may in most instances merely be vented to atmosphere from outlet 35, but in other instances may be delivered to a second controlled unit 53, to cause actuation of that unit in sequential relation with respect to and following unit 16. The air is then discharged from unit 53 in appropriate manner, and the operator releases actuating element 13 of valve 12, to enable upward return of valve element 38 to its FIG. 1 position. If desired, valve 12 may be of a type capable of automatically venting to atmosphere compressed air contained within the upper portion of body 20 when the valve is in its closed position for closing off the delivery of compressed air from source 11 to body 20.

One highly important advantage of the discussed impulse valve 10 resides in its capacity to supply only a single pressure impulse of a predetermined value to controlled unit 16 upon each actuation of valve 12. Even though valve 12 may remain in opened position after that impulse has been delivered, the impulse valve unit 10 will not function to deliver another impulse to controlled unit 16, since element 38 will remain in its lowered FIG. 2 position. In many prior valves, it has been very difficult to avoid unintentional multiple operation of a controlled unit such as that shown at 16 upon a single actuation of a main valve such as that shown at 12.

If the pressure impulses supplied to controlled unit 16 are too high or too low in value, the maximum pressure attained on each impulse can be regulated by adjusting pressure reducing valve 52, to thus alter the yielding resistance offered by the compressed air within valve element 38.

We claim:
1. A pressure impulse device comprising a body structure having an inlet for receiving fluid under pressure, a first outlet communicable therewith, and a second outlet for receiving fluid from said first outlet, and valve means mounted movably in the body structure for controlling the flow of fluid between said inlet and outlets, said valve means being normally urged yieldingly to a first position in which it passes fluid from said inlet to said first outlet, and being movable from said first position to a second position in which it closes off the flow of fluid from said inlet to said first outlet, said valve means being constructed and positioned for actuation from said first position to said second position by the pressure of fluid from said inlet, and said valve means being operable to place said second outlet in communication with said first outlet on movement of said valve means by said pressure fluid to said second position.

2. A pressure impulse device as recited in claim 1, including means for applying fluid pressure to said valve means in a relation yieldingly urging it to said first position and resisting movement thereof to said second position.

3. A pressure impulse device as recited in claim 1, in which said valve means include a slide valve unit exposed to the pressure of fluid from said inlet and movable axially thereby between said first position and said second position.

4. A pressure impulse device as recited in claim 1, in which said valve means are operable in said second position to close off communication between said inlet and outlet but to leave said valve means in communication with said inlet in a relation such that said pressure fluid retains the valve means in said second position.

5. A pressure impulse device as recited in claim 1, including a control valve for controlling the flow of fluid to said inlet and actuable between open and closed conditions.

6. A pressure impulse device as recited in claim 1, in which said valve means include a slide valve unit exposed exteriorly to the pressure of fluid from said inlet, there being means for introducing into the interior of said slide valve unit pressure fluid in isolation from said fluid which enters said body structure through said inlet and in a relation yieldingly urging said valve unit to said first position, 7. A pressure impulse device as recited in claim 1, including means for supplying fluid at a predetermined pressure to said inlet, said valve means being actuatable to said second position by a fluid pressure substantially less than that available at said inlet.

8. A pressure impulse device comprising a body structure having an inlet for receiving fluid under pressure, a first outlet communicable therewith, and a second outlet for receiving fluid from said first outlet, and valve means mounted movably in the body structure for controlling the flow of fluid between said inlet and outlets, said valve means being normally urged yieldingly to a first position in which it passes fluid from said inlet to said first outlet, and being movable from said first position to a second position in which it closes off the flow of fluid from said inlet to said first outlet, said valve means being constructed and positioned for actuation from said first position to said second position by the pressure of fluid from said inlet, said valve means being operable upon said movement toward said second position by said pressure fluid to first close off said fluid flow between said inlet and said first outlet, while maintaining said two outlets out of communication with one another, and to then upon continued movement place said second outlet in communication with said first outlet to receive said pressure fluid therefrom.

9. A pressure impulse device as recited in claim 8, including means connected to said first outlet and actuable by pressure fluid therefrom to perform a first operation, and means connected to said second outlet and actuable by pressure fluid therefrom to perform a second operation in delayed relation to said first operation.

10. A pressure impulse device comprising a body structure having an inlet for receiving fluid under pressure and an outlet communicable therewith, valve means mounted movably in the body structure for controlling the flow of fluid between said inlet and outlet, said valve means being normally urged yieldingly to an open position in which it passes fluid from said inlet to said outlet, and being movable from said open position to a second position in which it closes off the flow of fluid from said inlet to said outlet, said valve means being constructed and positioned for actuation from said open position to said second position by the pressure of fluid from said inlet, said valve means including a slide valve unit exposed exteriorly to the pressure of fluid from said inlet, and means for introducing into the interior of said slide valve unit pressure fluid in isolation from said fluid which enters said body structure through said inlet and in a relation yieldingly urging said valve unit to said open position, said last mentioned means including a projection extending into said valve unit and relative to which said valve unit is slidably movable in annularly sealed relation and containing a passage through which pressure fluid is delivered into the interior of the valve unit.

11. A pressure impulse device comprising a body structure having an inlet for receiving fluid under pressure, a first outlet communicable therewith, and a second outlet, and valve means mounted movably in the body structure for controlling the flow of fluid between said inlet and outlets, said valve means being normally urged yieldingly to a first position in which it passes fluid from said inlet to said first outlet, and being movable from said first position to a second position in which it closes off the flow of fluid from said inlet to said first outlet, said valve means being constructed and positioned for actuation from said first position to said second position by the pressure of fluid from said inlet, said valve means including a slide valve unit movable axially within the body structure, said body structure including a generally tubular structure disposed about said valve unit and relative to which the valve unit is movable, said tubular structure having an aperture communicating with said first outlet and having first and second portions offset in opposite axial directions from said aperture and communicating with said inlet and with said second outlet respectively, said slide valve unit being constructed to place said inlet in communication with said aperture through said first portion of the tubular structure when said valve unit is in said first position, and to place said second outlet in communication with said aperture through said second portion of the tubular structure when said valve means are in said second position.

12. A pressure impulse device comprising a body structure having an inlet for receiving fluid under pressure, a first outlet communicable therewith, and a second outlet for receiving fluid from said first outlet, and valve means mounted movably in the body structure for controlling the flow of fluid between said inlet and outlets, said valve means being normally urged yieldingly to a first position in which it passes fluid from said inlet to said first outlet, and being movable from said first position to a second position in which it closes off the flow of fluid from said inlet to said first outlet, said valve means being constructed and positioned for actuation from said first position to said second position by the pressure of fluid from said inlet, said valve means including a slide valve unit movable axially within the body structure, said body structure including a generally tubular structure disposed about said valve unit and relative to which the valve unit is movable, said tubular structure having an aperture communicating with said first outlet and having first and second ends facing in opposite axial directions and communicating with said inlet and with said second outlet respectively, said slide valve unit having a first seal ring engageable with said tubular structure between said aperture and said second end of the tubular structure in said first position of the valve unit to close off communication between said two outlets, but which is movable out of sealing engagement with said tubular structure in said second position of the valve unit to pass fluid from said first outlet to said second outlet, said slide valve unit having a second seal ring which is engageable with said tubular structure in sealing relation between said aperture and said first end of the tubular structure in said second position of the valve unit to close off communication between said inlet and said aperture, but is out of sealing engagement with the tubular structure in said first position of the valve unit to pass fluid from the inlet to said aperture.

13. A pressure impulse device as recited in claim 12 in which said pressure fluid from the inlet is applied exteriorly to said valve unit at a first end thereof, said valve unit being hollow, and there being a projection extending into and slidably engaging said valve unit at the second end thereof in sealed relation and containing a fluid passage through which pressure fluid is admitted into the interior of said valve unit in isolation from the fluid at the outside thereof to yieldingly urge said valve unit toward said first position.

14. A pressure impulse device as recited in claim 13, in which said two seal rings are simultaneously engageable in sealing relation with said tubular structure at opposite sides of said aperture in an intermediate position of the valve unit between said first position and said second position.

15. A pressure impulse device as recited in claim 14, in which said body structure includes a main body part having a chamber containing said tubular structure, with said inlet and said second outlet connecting into said chamber beyond opposite ends of the tubular structure, said body structure including an end wall closing one end of said chamber and carrying said projection which extends into the valve unit.

References Cited
UNITED STATES PATENTS 2,696,827   12/1954   Deardorff et al. _____ 137—102

NATHAN L. MINTZ, *Primary Examiner.*